(12) United States Patent
Ghemawat et al.

(10) Patent No.: US 7,668,846 B1
(45) Date of Patent: Feb. 23, 2010

(54) DATA RECONSTRUCTION FROM SHARED UPDATE LOG

(75) Inventors: Sanjay Ghemawat, Mountain View, CA (US); Wilson C. Hsieh, New York, NY (US)

(73) Assignee: Google Inc., Mountain View, CA (US)

( * ) Notice: Subject to any disclaimer, the term of this patent is extended or adjusted under 35 U.S.C. 154(b) by 464 days.

(21) Appl. No.: 11/197,923

(22) Filed: Aug. 5, 2005

(51) Int. Cl.
*G06F 17/00* (2006.01)
(52) U.S. Cl. .................. 707/101; 707/102; 707/103 R; 707/104.1
(58) Field of Classification Search ............... 707/1–10, 707/100–104.1, 200–206
See application file for complete search history.

(56) References Cited

U.S. PATENT DOCUMENTS

| | | | |
|---|---|---|---|
| 5,386,559 A | 1/1995 | Eisenberg et al. | 395/600 |
| 5,414,834 A | 5/1995 | Alexander et al. | 395/600 |
| 5,668,352 A | 9/1997 | Christian et al. | 178/18 |
| 5,729,730 A | 3/1998 | Wlaschin et al. | 395/603 |
| 5,794,228 A | 8/1998 | French et al. | 707/2 |
| 5,856,826 A | 1/1999 | Craycroft | 345/346 |
| 5,918,225 A | 6/1999 | White et al. | 707/3 |
| 5,946,699 A | 8/1999 | Sawashima et al. | 707/203 |
| 5,953,503 A | 9/1999 | Mitzenmacher et al. | 395/200 |
| 6,006,232 A | 12/1999 | Lyons | 707/101 |
| 6,169,990 B1 | 1/2001 | McGregor et al. | 707/101 |
| 6,182,121 B1 | 1/2001 | Wlaschin | 709/215 |
| 6,233,580 B1 | 5/2001 | Kaplan et al. | 707/101 |
| 6,289,358 B1 | 9/2001 | Mattis et al. | 707/203 |
| 6,298,342 B1 | 10/2001 | Graefe et al. | 707/4 |
| 6,430,549 B1 | 8/2002 | Gershfield et al. | 707/2 |
| 6,618,737 B2 | 9/2003 | Aridor et al. | 707/205 |
| 6,636,870 B2 | 10/2003 | Roccaforte | 707/109 |
| 6,725,225 B1 | 4/2004 | Kori | 707/101 |
| 6,728,727 B2 | 4/2004 | Komine et al. | 707/103 |
| 6,778,996 B2 | 8/2004 | Roccaforte | 707/104 |
| 6,879,984 B2 | 4/2005 | Duddleson et al. | 707/101 |
| 6,909,384 B2 | 6/2005 | Baldwin et al. | 341/55 |
| 6,937,171 B2 | 8/2005 | Baldwin et al. | 341/87 |
| 7,013,304 B1 | 3/2006 | Schüetze et al. | 707/100 |
| 7,024,414 B2 | 4/2006 | Sah et al. | 707/101 |
| 7,026,964 B2 | 4/2006 | Baldwin et al. | 341/87 |
| 7,028,039 B2 | 4/2006 | Burrows et al. | 707/101 |

(Continued)

OTHER PUBLICATIONS

Barroso, L., et al., "Memory System Characterization of Commercial Workloads," Proceedings of the 25th International Symposium on Computer Architecture, Barcelona, Jun. 1998, pp. 3-14.

(Continued)

*Primary Examiner*—Isaac M Woo
(74) *Attorney, Agent, or Firm*—Morgan, Lewis & Bockius LLP

(57) ABSTRACT

Updates to a plurality of data sets may be recorded in a shared update log. Whenever a server responsible for the plurality of data sets fails, other servers may reconstruct the data sets using the shared update log and redundant copies of the data sets. As part of the reconstruction process, the other servers reorganize (e.g., by sorting) the update records of sub-logs of the update log to group update records corresponding to the same data set together. The updates are applied to the redundant copies of the data set snapshots to reconstruct the data set.

16 Claims, 8 Drawing Sheets

U.S. PATENT DOCUMENTS

| | | | |
|---|---|---|---|
| 7,085,768 B2 | 8/2006 | Scott et al. | 707/101 |
| 7,103,588 B2 | 9/2006 | Beck et al. | 707/2 |
| 7,103,608 B1 | 9/2006 | Ozbutun et al. | 707/102 |
| 7,181,457 B2 | 2/2007 | Reinauer et al. | 707/10 |
| 7,237,062 B2 | 6/2007 | Lubbers et al. | 711/114 |
| 2002/0038301 A1 | 3/2002 | Aridor et al. | 707/10 |
| 2002/0178171 A1 | 11/2002 | Walker et al. | 707/102 |
| 2003/0200235 A1 | 10/2003 | Choy et al. | 707/203 |
| 2003/0204534 A1 | 10/2003 | Hopeman et al. | 707/200 |
| 2004/0148301 A1 | 7/2004 | McKay et al. | 707/101 |
| 2004/0236728 A1 | 11/2004 | Newman et al. | 707/3 |
| 2005/0071336 A1* | 3/2005 | Najork et al. | 707/8 |
| 2005/0120293 A1 | 6/2005 | Benhase et al. | 715/504 |
| 2005/0149584 A1 | 7/2005 | Bourbonnais et al. | 707/204 |
| 2005/0219076 A1 | 10/2005 | Harris | 341/51 |
| 2006/0123035 A1 | 6/2006 | Ivie | 707/101 |
| 2006/0129609 A1* | 6/2006 | Kunze | 707/201 |

OTHER PUBLICATIONS

Elmasri, R., et al., Portions of Chapters 24 and 25 of Fundamentals of Database Systems, Addison-Wesley, Reading, MA, 2004, pp. 767-819.

Gamal-Eldin, M.S., et al., "Integrating Relational Databases with Support for Updates," Proceedings of 1988 Int'l Symposium on Databases in Parallel and Distributed Systems, Dec. 5, 1988, pp. 202-209.

Kouramajian, V., et al., "Mapping of 2-D Temporal Extended ER models in Temporal FNF and NFNF Relational Models," Int'l Conf on the Entity-Relationship Approach, Amsterdam, Netherlands, Oct. 23, 1991, pp. 671-689.

Antoshenkov, G., "Dictionary-based Order Preserving String Compression," Feb. 1997, Springer-Verlag New York, Inc., vol. 6, Issue 1 pp. 26-39.

Bentley, J., et al., "Data Compression Using Long Common Strings," Proceedings of the IEEE Data Compression Conf., Mar. 1999, pp. 287-295.

Chang, F., "Bigtable: A Distributed Storage System for Structured Data," OSDI 2006: 7th USENIX Symposium on Operating Systems Design and Implementation, pp. 205-218.

Chen, Z. et al., "Query Optimization in Compressed Database Systems," Year 2001, ACM, pp. 271-282.

International Search Report and Written Opinion for International Application No. PCT/US2006/028236, mailed Feb. 8, 2007, 12 pages.

* cited by examiner

Physical Storage of Locality Group Files (key- value pairs)

ver, update records for a respective data set are accessed from the sorted sub-log, and the accessed update records are applied to produce a reconstructed data set.
US 7,668,846 B1

DATA RECONSTRUCTION FROM SHARED UPDATE LOG

RELATED APPLICATIONS

This application is related to the following applications: U.S. patent application Ser. No. 11/197,925, titled "Large Scale Data Storage in Sparse Tables," filed Aug. 5, 2005; U.S. patent application Ser. No. 11/197,924, titled "Storing a Sparse Table Using Locality Groups," filed Aug. 5, 2005; and U.S. patent application Ser. No. 11/197,922, titled "Data Compression of Large Scale Data Stored in Sparse Tables," filed Aug. 5, 2005; which are incorporated by reference herein in their entirety.

TECHNICAL FIELD

The disclosed embodiments relate generally to data storage. Particularly, the disclosed embodiments relate to reconstructing data from a log of update records.

BACKGROUND

Organization of information is an important part of any enterprise. Proper organization of information or data makes the data easier to find and use, which helps to increase data access efficiency, and also facilitates data recovery in case of a system failure.

Data may be stored in a distributed system. The distribution spreads the data over many computers and can improve efficiency in accessing the data. However, a problem arises when a computer in the system fails. The failed computer may be responsible for many sets of data and any appreciable delay in recovering the data sets handled by the failed computer can greatly reduce the effectiveness of the distributed system.

Accordingly, it is highly desirable to provide an efficient manner of data recovery in a distributed system.

SUMMARY

According to some embodiments, a method of processing data includes, at a first server, identifying a plurality of data sets and recording update records associated with the data sets in an update log, which includes one or more non-overlapping sub-logs, each sub-log having a subset of the update records. Each update record reflects a change made to a respective one of the data sets. At one or more second servers, the update records of a respective sub-log are reorganized into update record subsets, each update record subset including the update records for a corresponding data set, and each update record subset is applied to a corresponding data set to produce a reconstructed data set, thereby producing a plurality of reconstructed data sets.

According to some embodiments, a method of processing data includes, at a first server, identifying a plurality of data sets, and recording update records associated with the data sets in an update log, the update log including one or more non-overlapping sub-logs, each sub-log including a subset of the update records. Each update record reflects a change made to a respective one of the data sets. At a second server, the update records of a respective sub-log are sorted based on predefined criteria to produce a sorted sub-log, and at a third server, update records for a respective data set are accessed from the sorted sub-log, and the accessed update records are applied to produce a reconstructed data set.

According to some embodiments, a method of reconstructing a data set, includes accessing an update log comprising update records associated with a plurality of data sets, each update record reflecting a change made to a respective one of the data sets, the update log including a plurality of non-overlapping sub-logs, each sub-log including a subset of the update records in the update log. Accessing the update log includes accessing a respective sub-log of the plurality of non-overlapping sub-logs. The method further includes reorganizing the update records of the respective sub-log into update record subsets, each update record subset comprising the update records for a corresponding data set, and applying a respective update record subset to a corresponding data set to produce a reconstructed data set.

According to some embodiments, a system of processing data includes a first computer, which includes storage for storing a plurality of data sets, and executable instructions for recording update records associated with the data sets in an update log, the update log including one or more non-overlapping sub-logs, each sub-log comprising a subset of the update records, each update record reflecting a change made to a respective one of the data sets. A second computer includes executable instructions for reorganizing the update records of a respective sub-log into update record subsets, each update record subset comprising the update records for a corresponding data set, and applying each update record subset to a corresponding data set to produce a reconstructed data set; and storage for storing the reconstructed data set.

According to some embodiments, a computer system for processing data, includes one or more processors, executable instructions to access an update log having update records associated with a plurality of data sets, each update record reflecting a change made to a respective one of the data sets, the update log including a plurality of non-overlapping sub-logs, each sub-log including a subset of the update records in the update log. The instructions to access the update log include instructions to access a respective sub-log of the plurality of non-overlapping sub-logs. The computer system further includes instructions to reorganize the update records of the respective sub-log into update record subsets, each update record subset comprising the update records for a corresponding data set; instructions to apply a respective update record subset to a corresponding data set to produce a reconstructed data set; and storage for storing the reconstructed data set.

According to some embodiments, a computer program product for use in conjunction with a computer system for processing data includes instructions for accessing an update log comprising update records associated with a plurality of data sets, each update record reflecting a change made to a respective one of the data sets, the update log including a plurality of non-overlapping sub-logs, each sub-log including a subset of the update records in the update log. Accessing the update log includes accessing a respective sub-log of the plurality of non-overlapping sub-logs. The computer system further includes instructions for reorganizing the update records of the respective sub-log into update record subsets, each update record subset comprising the update records for a corresponding data set, and instructions for applying a respective update record subset to a corresponding data set to produce a reconstructed data set.

BRIEF DESCRIPTION OF THE DRAWINGS

Like reference numerals refer to corresponding parts throughout the drawings.

DESCRIPTION OF EMBODIMENTS

Figure 1:
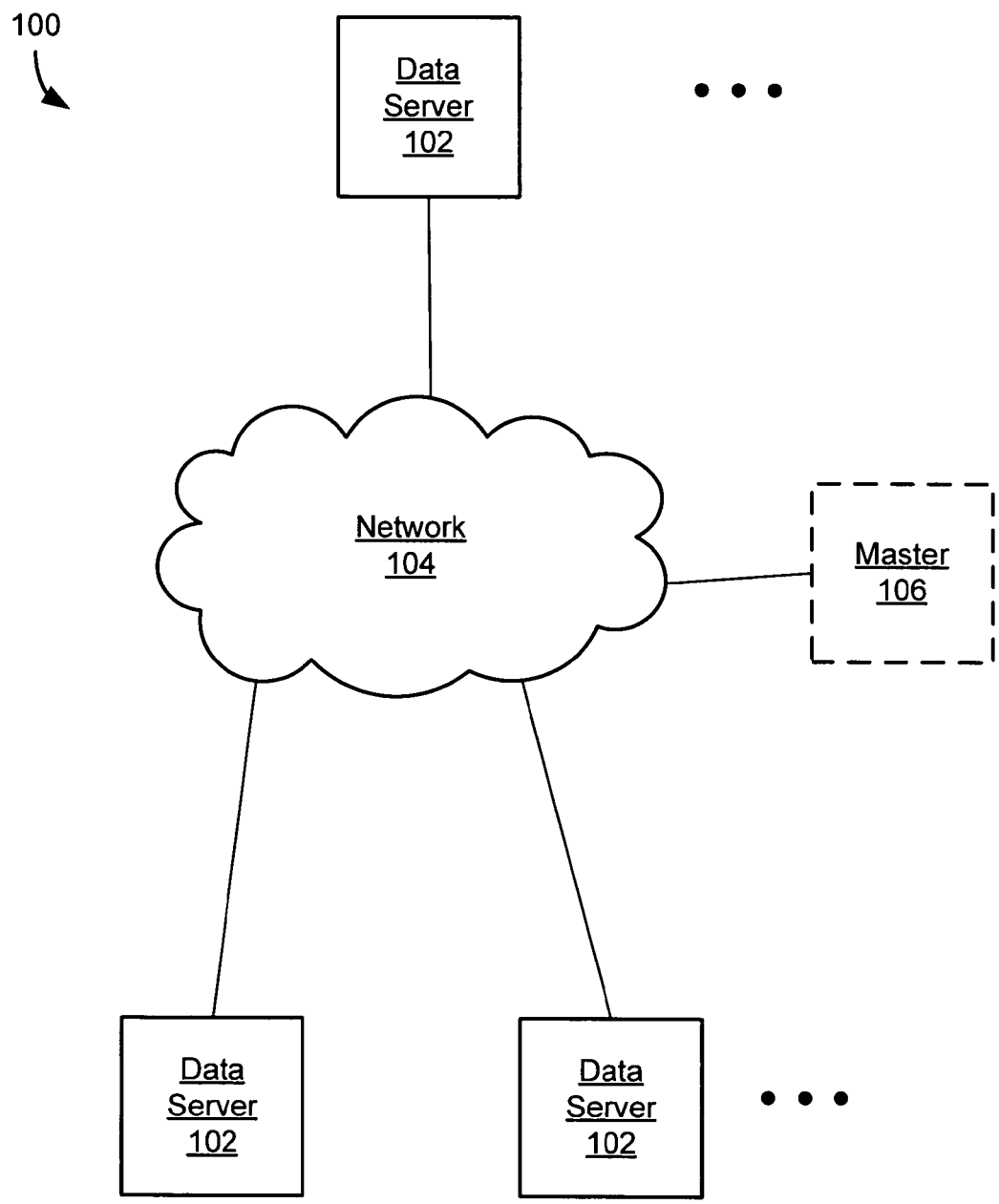
FIG. 1 is a block diagram illustrating a network, according to some embodiments of the invention.

FIG. 1 illustrates a distributed system 100, according to some embodiments of the invention. The system 100, sometimes called a data center, includes a plurality of data servers 102, which are interconnected by a network 104. The network 104 may be any suitable network, including but not limited to a local area network (LAN), a wide-area network (WAN), the Internet, an Ethernet network, a virtual private network (VPN), or any combination of such networks.

The data servers 102 are a part of a distributed data storage system. The system distributes the data it stores amongst the plurality of data servers 102. The data may be divided into a plurality of data sets and each data set is stored in a data server 102 within the distributed system or data center 100. A data server 102 may be assigned a data set and thus becomes responsible for providing contents of the data set to other computers (serving the data) and managing the data set, including processing updates to the data set. In some embodiments, the system also provides for data redundancy by storing a plurality of copies of each data set, with each copy of a data set stored on a different data server 102.

In some embodiments, the operation of the plurality of the data servers 102 may be coordinated by a master 106. The master may assign and reassign data sets to data servers, monitor the status of each data server, and perform load balancing procedures.

Whenever a data server responsible for a data set fails, another data server within the distributed data storage system may be assigned responsibility for that data set. The other data server reconstructs that data set and takes responsibility for that data set. In some implementations, many of the data servers in a system host a plurality of data sets, for example between ten and several hundred data sets. When a data server that hosts a plurality of data sets fails, the master reassigns all the data sets previously hosted by the failed data server to other data servers, each of which must then reconstruct the data set or sets (s) newly assigned to it.

In some embodiments, the data sets stored in the system 100 are subsets of a multi-dimensional sparse map data structure. The data servers 102 are each assigned responsibility for one or more of these subsets, which may be called "tablets." Further information regarding the multi-dimensional data structure and tablets are disclosed in U.S. patent application Ser. No. 11/197,925, titled "Large Scale Data Storage in Sparse Tables", filed Aug. 5, 2005 and U.S. patent application Ser. No. 11/197,924, titled "Storing a Sparse Table Using Locality Groups," filed Aug. 5, 2005, both of which are incorporated by reference, as described above.

Figure 2A:
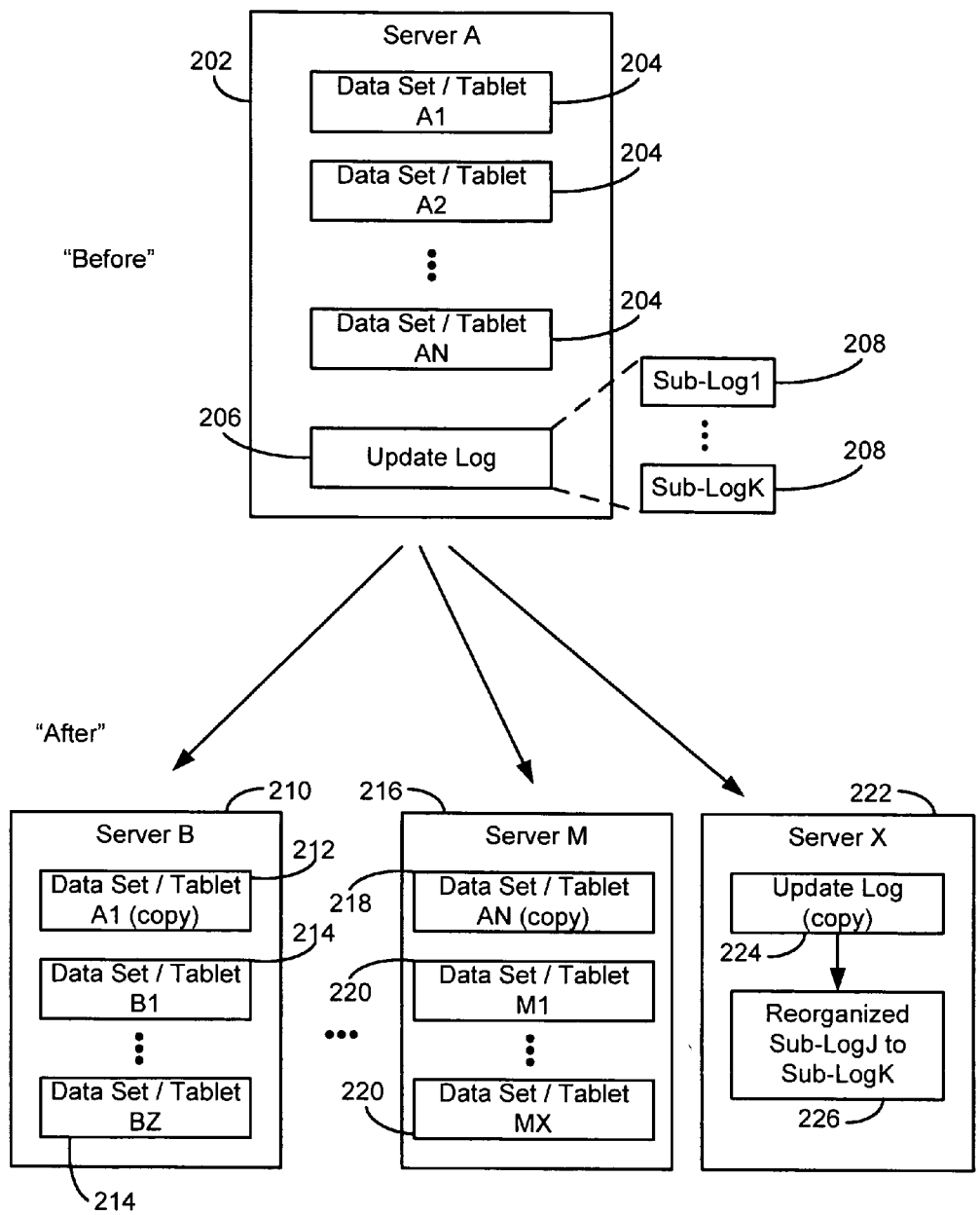
FIG. 2A is a block diagram illustrating data sets stored in data servers before and after a data reconstruction process, according to some embodiments of the invention.

FIG. 2A is a block diagram illustrating data sets stored in data servers before and after a data reconstruction process, according to some embodiments of the invention. In the "before" diagram, Server A 202, which may be a data server in a distributed data storage system such as a data center 100, is assigned responsibility for serving and maintaining a plurality of data sets 204. The data sets 204 (illustrated as data sets/tablets A1-AN) are stored in Server A 202 and served from Server A to other computers. It should be appreciated that other copies of the data sets 204 may be stored in other data servers not shown in FIG. 2 for data redundancy purposes, but primary responsibility for serving and maintaining the data sets 204 belongs to the server to which the data sets 204 are assigned, namely Server A 202.

In some embodiments, each data set 204 may include a base set of data and one or more supplemental sets of data. The additional sets of data reflect the additions and deletions to the base set of data that have already been committed. The base set and supplemental sets form a snapshot of the data set at a particular time. The snapshot and any update records in the update log that reflect updates made after the last change included in the snapshot constitute the most current state of the data set.

Also stored on Server A 202 is an update log 206. The update log 206 includes update records for all of the data sets 204 for which Server A 202 is responsible; the update log 206 is "shared" by the data sets 204 assigned to Server A 202. Having one shared update log, as opposed to an update log for each data set, improves the update efficiency of Server A 202 because it reduces the number of log files that are maintained by Server A 202. Redundant copies of the update log 206 are stored in other data servers. Updates to the data sets 204 are reflect in both a memory state array stored in volatile memory and in the update log 206, which stored in non-volatile memory of Server A 202. The memory state array in volatile memory provides for fast access to the update records, and the update log 206 in non-volatile storage provides permanent storage of updates and failover protection.

The update log 206 may be stored in Server A 202 as one or more sub-logs 208. Each sub-log 208 is a finitely sized segment of the update log 206. The sub-logs 208 do not overlap with each other. That is, an update record cannot be in two sub-logs at the same time. In some embodiments, the sub-log sizes are predefined. For example, in some embodiments, the size of all sub-logs 208 may be predefined to be at most 64 megabytes. In some other embodiments, the sub-logs may be predefined to be at most 64 kilobytes, 36 megabytes, or any other suitable size. Each sub-log 208 includes update records, up to the sub-log size, ordered by the time of application of each update. Thus, for example, the first sub-log includes the update records that are applied earliest, up to the sub-log size. The second sub-log includes the next earliest update records, and so forth. The update log 206 may be analogized to a queue of update records, where the update records are stored and applied in the order that they were added to the queue, and the sub-logs are non-overlapping (i.e., mutually exclusive of other sub-logs in terms of the update records included) segments of the queue.

Figure 2B:
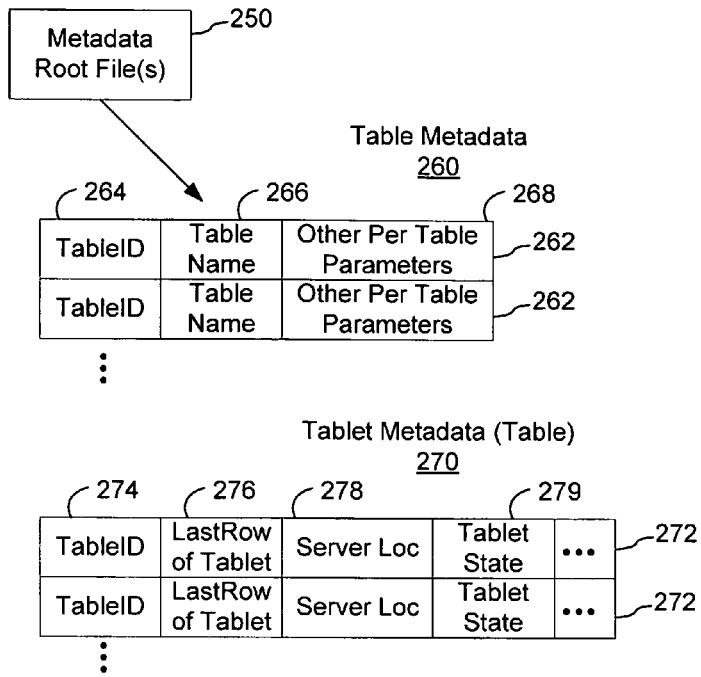
FIG. 2B is a block diagram of data structures for storing metadata information about a set of tables.

FIG. 2B is a block diagram of data structures for storing metadata associated with a set of tables. The metadata includes table metadata 260 and tablet metadata 270. Some of the metadata sets, such as the table metadata 260, are sufficiently small that they may be stored in a small number of files having predefined names. At least one of the metadata sets, namely the tablet metadata 270, is sufficiently voluminous in some embodiments that this metadata is itself stored in a table data structure, which in turn has many tablets. In some embodiments, the tablet metadata table 270 contains thousands, hundreds of thousands or millions of entries 272, each of which indicates the location of a distinct respective tablet in a data center (or distributed system) 100.

In some embodiments the table metadata 260 includes a record 262 for each distinct table stored in a single data center 100. Each table metadata record 262 may include a table identifier 264, a name of the table 266, and optionally may include other per table parameters 268 (e.g., the identifier of an administrator or creator of the table).

In some embodiments, the tablet metadata 270 includes a record 272 for each distinct tablet stored in a single data center 150. Each tablet metadata record 272 may include a table identifier 274, the name of the last row of the tablet 276, an identifier or location 278 of the server to which the tablet is assigned (i.e., the server which handles access to and updates to the tablet), and a set of information 279 representing the state of the tablet. In some embodiments, tablet state information 279 includes a list of the files (see files 280, 282, FIG. 2C) that store the content of the tablet 204, a list of the sub-log files 404 (FIG. 4) that would be needed to recover the state of the tablet in a failover, and a log position indicating the position of the first update record in the shared update log 206 to be used for recovering the state of the tablet in a failover. The tablet metadata records 272 may optionally include additional fields. The combination of the table identifier 274 and last row name or identifier 276 may be considered to be the key of the tablet metadata table 270, because all the tablet metadata records 272 are ordered within the tablet metadata table 270 in accordance with the table identifier concatenated with the last row name or identifier. In some other embodiments, each tablet metadata record may include the table identifier and the name of the first row of the next tablet in the table as the key of tablet metadata table. If a tablet is the last tablet of a table, a predefined "infinity" designation may be used in place of the name of the (non-existent) first row in the next tablet in the table.

The range of rows included in any particular tablet is specified by the last row name or identifiers in two tablet metadata records 272: the record 272 the particular tablet and the immediately preceding record 272 in the tablet metadata table. If the immediately preceding record 272 in the tablet metadata table has a different table identifier, then the current tablet is the first tablet of its table.

To locate the tablet that stores a specified row of a table, the tablet metadata 270 is searched or scanned until the first tablet metadata record is found that (A) has the same table identifier as the tablet and (B) has a last row that is equal (i.e., has the same value or sort value) or greater (i.e., has a higher value, or sort value) than the specified row. This record identifies the tablet that stores the specified row, and the server location 278 specified by the record identifies the server which handles access to the identified tablet. In the embodiments where the tablet key is the table identifier and the name of the first row of the next tablet of the table, the record identifying the tablet that stores a specified row of a table is located by scanning the tablet metadata until the first tablet metadata record is found that (A) has the same table identifier as the tablet and (B) has a first row (of the next tablet) name that is greater (i.e., has a higher value, or sort value) than the specified row.

Figure 2C:
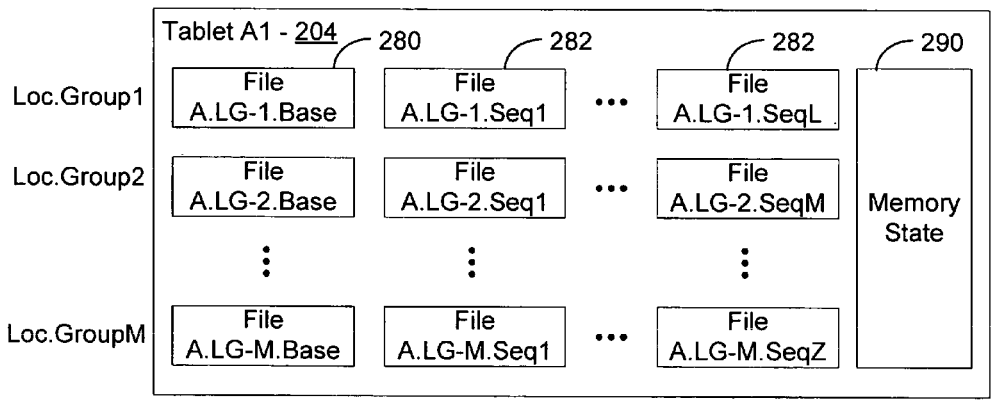
FIG. 2C is a block diagram of files and data structures that store all the data values associate with a tablet (also herein called a data set)
Figure 2D:
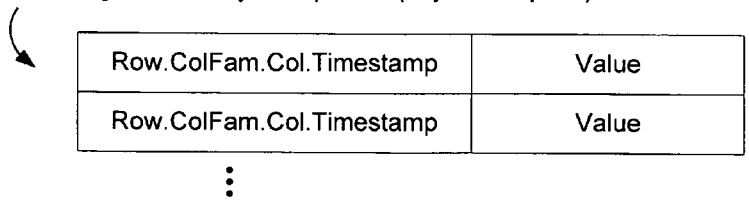
FIG. 2D is a block diagram of the content of a single data file, sometimes called a locality group file.

FIG. 2C is a block diagram of the files used by one server to store a tablet 204 and updates to the tablet. As shown, for each locality group in a tablet 204 there is a main or base file 280, and a set of one or more update files 282. In addition, updates to the locality group of the tablet 204 since the last time an update file 282 was produced are stored in a memory state array 290, which is stored in the main memory of the server hosting the tablet 204. As shown in FIG. 2D, each of the locality group files 280, 282 and the memory state 290 contains sets of key-value pairs. In some embodiments, the key value pairs of each locality group file are stored in key sorted order (i.e., starting at a lowest key value in the file and progressing monotonically to the highest key value in the file, or vice versa) along with an index on the keys for fast access. Since the update files 282 of a locality group are created after the creation of the base file 280, the update files 282 may contain new values for some of the same keys found in the base file.

Whenever a compaction trigger event occurs (e.g., episodically, when the memory of a server reaches a predefined level of fullness, or the memory state array 290 reaches a predefined size or level of fullness, and/or periodically, when the passage of a time since a last compaction reaches a predefined threshold), the update information in the memory state array 290 is used to generate new update files 282 for the locality groups for which the memory state array 290 contains updates. If, as a result, the number of files 280, 282 for a locality group exceeds the maximum number of files allowed for that locality group (as specified by either the metadata for the locality group, or by a default value), then two or more of the update files 282 are combined so as to reduce the number of update files 282. In an alternate embodiment, when the number of update files 282 is already at its maximum allowed value for a locality group, the update information in the memory state 290 is added to the newest of the update files.

When performing a "compaction," which means combining two or more locality group files 280, 282, if the same key is found in two files 280, 282, then the newer value for the key is retained and the older value is discarded.

Referring again to FIG. 2A, whenever Server A 202 fails, other data servers are assigned responsibility for the data sets 204 for which Server A 202 was primarily responsible. The other data servers reconstruct their newly assigned data sets using the redundant copies of the data sets 204 and of the update log 206. The "after" diagram in FIG. 2 illustrates the result of the reconstruction. A plurality of data servers (for example, Server B 210 thru Server M 216) are assigned responsibility for the data sets 204 for which Server A 202 was responsible. Each of the plurality of servers may be assigned one or more of the data sets 204, but no data set 204 is assigned to two or more data servers. For convenience of explanation, Server B 210 thru Server M 216 are described as being each assigned one data set from failed Server A 202. The process of data reconstruction is described in further detail below, in relation to FIGS. 5-7.

Server B 210 is assigned data set/tablet A1 of the data sets 204. Server B 210 stores a reconstructed copy 212 of data set A1, as well as data sets B1-BZ 214 to which it was already assigned. Server M 216 is assigned data set/tablet AN of the data sets 204. Server M 216 stores a reconstructed copy 218 of data set AN, as well as data sets M1-MX 220 to which it was already assigned.

Another data server in the system, Server X 222, has a copy 224 of the update log 206. The copy 224 may be one of the redundant copies of the update log. The update records within the sub-logs of the update log copy 224 may be reorganized to form reorganized sub-logs 226. A copy of a sub-log 208 that is in the update log copy 224 is reorganized into a reorganized sub-log 226. The reorganization includes reorganization of the update records in the copy of the sub-log such that the update records corresponding to a particular data set are grouped together in a contiguous subset, while maintaining the original relative order of those update records in the sub-log. In some embodiments, the reorganization is done by sorting the update records in the sub-log by the identifier of the corresponding data set and then by the original order of application. Further details regarding the reorganization are described below, in relation to FIGS. 4A-4B.

Figure 3:
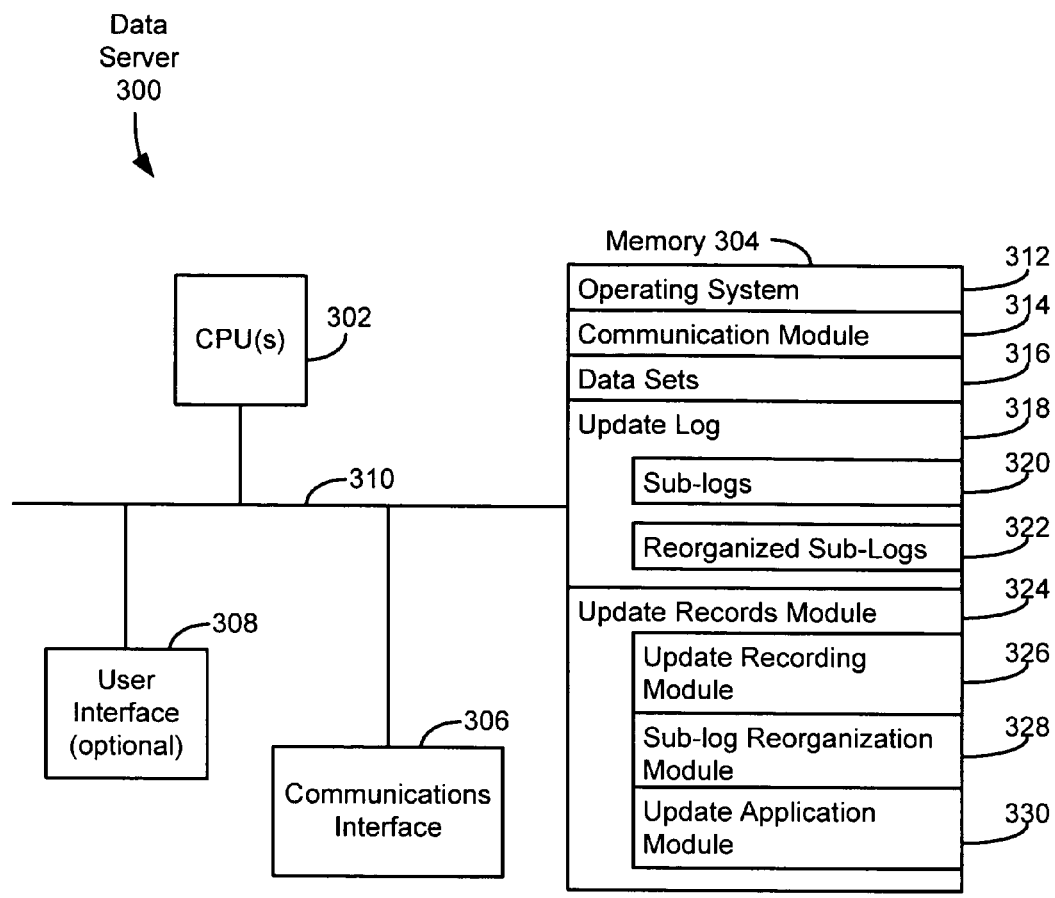
FIG. 3 is a block diagram illustrating a data server, according to some embodiments of the invention.

FIG. 3 is a block diagram illustrating a data server 300, according to some embodiments of the present invention. The data server 300 typically includes one or more processing units (CPU's) 302, one or more network or other communications interfaces 306, memory 304, and one or more communication buses 310 for interconnecting these components. The data server 300 optionally may include a user interface 308, which may include a display device, a mouse, and a keyboard. The memory 304 includes high-speed, volatile, random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 304 may optionally include one or more storage devices remotely located from the CPU(s) 302. In some embodiments, the memory 304 stores the following programs, modules and data structures, or a subset thereof:
- an operating system 312 that includes procedures for handling various basic system services and for performing hardware dependent tasks;
- a network communication module 314 that is used for connecting the data server 300 to other computers via the one or more communication network interfaces 306 and one or more communication networks, such as the Internet, other wide area networks, local area networks, metropolitan area networks, or any suitable combination thereof;
- a plurality of data sets 316;
- an update log 318; and
- an update records module 324.

The update log 318 includes a plurality of sub-logs 320, which are segments of the update log 318. Reorganized sub-logs 322 are sub-logs in which the update records are reorganized into subsets based the corresponding data sets, may also be included.

The update records module 324 includes an update recording module 326 which records update records in the update log, a sub-log reorganization module 328 which reorganizes sub-logs, and an update application module 330 that applies the update records to the data sets or copies thereof.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 312 may store a subset of the modules and data structures identified above. Furthermore, memory 312 may store additional modules and data structures not described above.

Although FIG. 3 shows a data server, FIG. 3 is intended more as functional description of the various features which may be present in a data server, or a set of such servers, than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers.

Figure 4A:
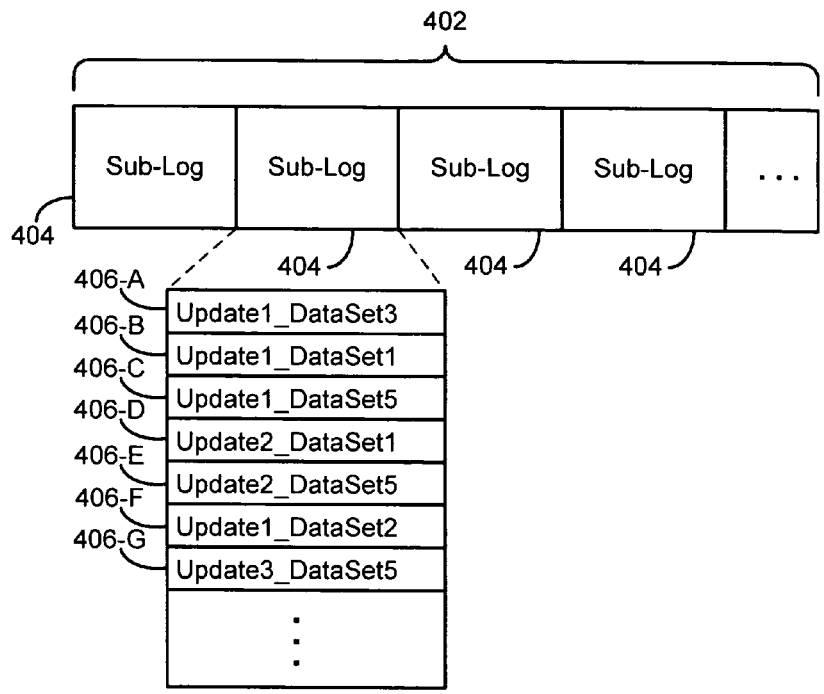
FIGS. 4A-4B are block diagrams illustrating update logs, according to some embodiments of the invention.
Figure 4B:
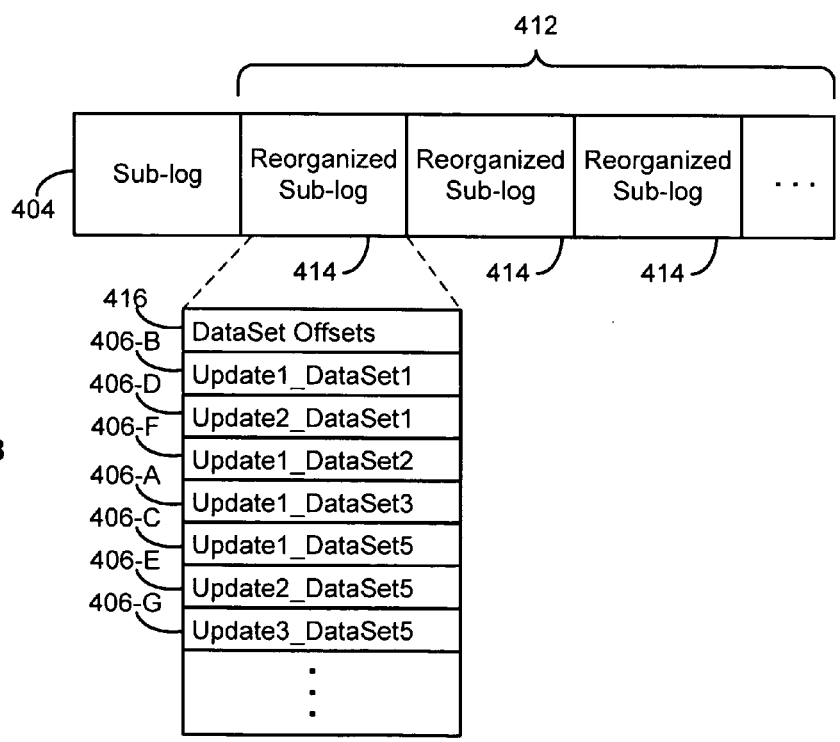

FIGS. 4A and 4B are block diagrams illustrating update logs, according to some embodiments of the invention. In FIG. 4A, an update log 402 includes a plurality of sub-logs 404. Within each sub-log 404 are a plurality of update records 406-A-406-G. In FIG. 4A, the sub-logs 404 have not yet been reorganized. The update records 406-A-406-G are in their order of application and update records for the same corresponding data set are not necessarily consecutive. It should be appreciated that the order of application for the update records establishes a relative order for update records corresponding to a particular data set. For example, the update records corresponding to DataSet5 406-C, 406-E, 406-G have a relative order within the sub-log, irrespective of their actual positions within the sub-log. The relative order is that the Update1_DataSet5 406-C is first because it is the earliest of the update records within the sub-log that is applied to DataSet5, Update2_DataSet5 406-E is second because it is the second update record that is applied, Update3_DataSet5 406-G is third, and so forth.

FIG. 4B illustrates an update-log 412 that includes reorganized sub-logs 414. The sub-logs 404 (FIG. 4A) are reorganized into reorganized sub-logs 414 on a sub-log by sub-log basis, rather than the update log as a whole. Further, as described above, the tablet metadata 272 for each tablet identifies the oldest sub-log required for regenerating the tablet during a failover. Only those sub-logs 404 needed for the failover are reorganized. Within each reorganized sub-log 414, the update records are grouped by their corresponding data sets, while maintaining their original relative order, forming subsets of update records. Each of the subsets includes update records for a particular data set. In some embodiments, the subsets in the re-organized sub-log are sorted by the identifier of the data set. In other words, the update records are sorted by data set identifier and then by the original relative order. For example, in FIG. 4B, the subset including the update records corresponding to DataSet1, namely update record 406-B and 406-D, are first in the reorganized sub-log. Following the update records corresponding to DataSet1 are update records corresponding to DataSet2 (406-F), DataSet3 (406-A), and DataSet5 (406-C, 406-E, 406-G), respectively. Within each subset, the original relative order of the update records in the update log is maintained. For example, in the subset corresponding to DataSet5, Update1 406-C is still first amongst the update records corresponding to DataSet5, Update2 406-E is still second, and Update3 406-G is still third.

The reorganized sub-log also includes DataSet Offsets 416. The DataSet Offsets 416 indicate the positions of the update record subsets within the reorganized sub-log. For instance, the DataSet Offsets 416 may include a set of (dataset, offset value) pairs, each of which specifies the starting location of a respective update record subset. A data server reconstructing a data set may use the offsets to determine if a reorganized sub-log has update records corresponding to the data set to be reconstructed and jump directly to those update records, if any, without searching through the entire sub-log.

Figure 5:
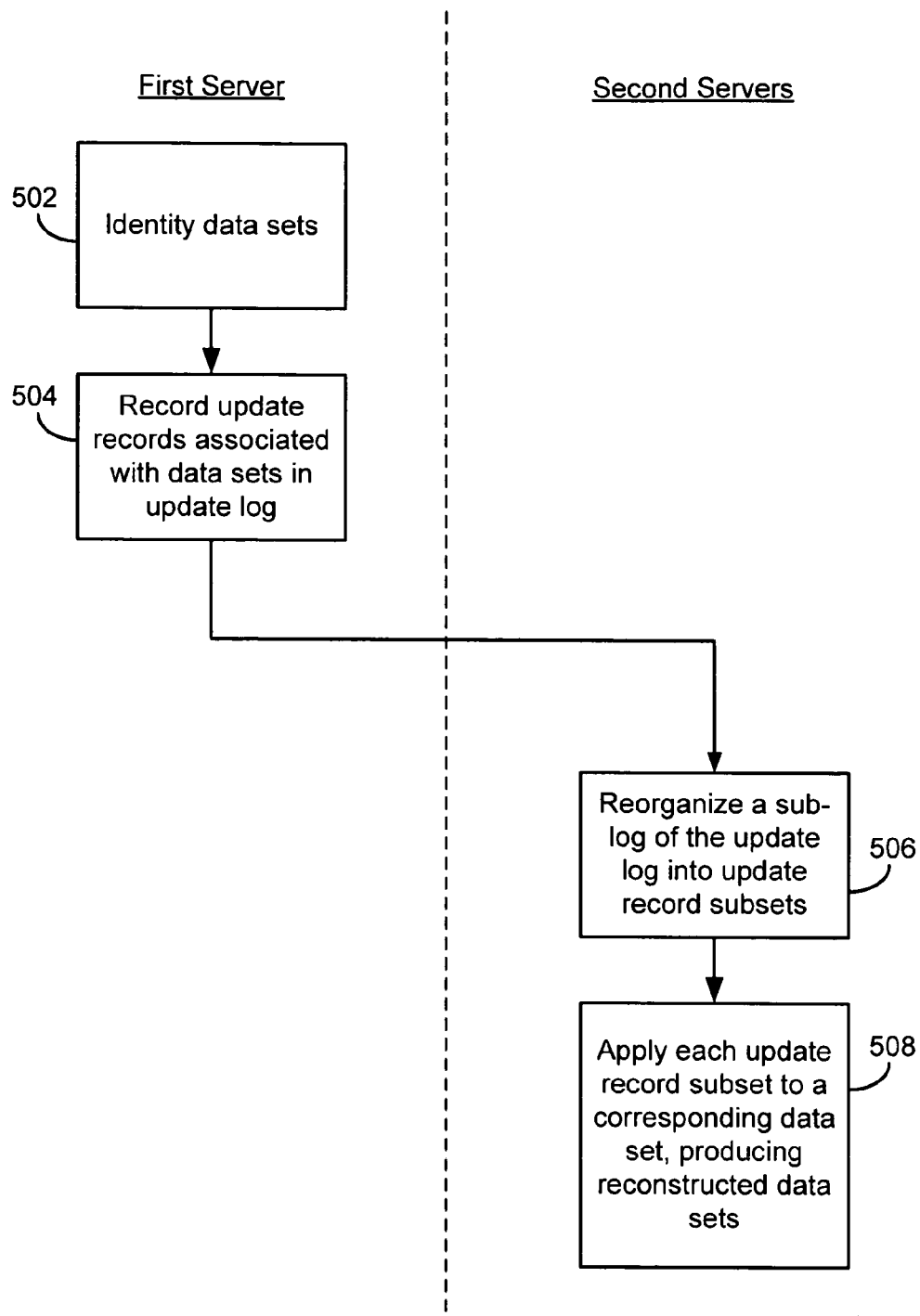
FIG. 5 is a flow diagram illustrating a process for reconstructing a data set, according to some embodiments of the invention.

FIG. 5 is a flow diagram illustrating a process for reconstructing a data set, according to some embodiments of the invention. At a first server, a plurality of data sets are identified (502). The identified data sets are the data sets that are assigned to the first server. Update records associated with the identified data sets are recorded in the update log (504). Whenever there is data written to the data sets or deleted from the data sets, an update record is recorded to the shared update log.

A second server reorganizes a sub-log of the update log into update record subsets (506). Whenever the first server fails, one or more second servers are assigned responsibility for the identified data sets. To reconstruct the data sets, the second servers reorganize each sub-log of the update log (more particularly, one of the redundant copies of the update log) into update record subsets. In some embodiments, the sub-log reorganization process includes each of the second servers randomly choosing one of the sub-logs for reorganization. For any one second server, if the chosen sub-log has not been reorganized already and no reorganization is in progress or pending, then it proceeds with the reorganization. Otherwise, another sub-log is chosen. This process continues until all off the sub-logs of the first server are reorganized.

As described above, in some embodiments, the reorganization includes sorting the update records within a sub-log by the corresponding data set identifier and then by the original relative order, thus grouping the update records based on the corresponding data set while maintaining the relative order in which the updates are applied. As also noted above, the tablet metadata 272 for each tablet identifies (e.g., indicates the position of) the oldest update record required to reconstruct the tablet after a failover. Typically, the identified update record is the first update records stored to the update log after the last successfully completed minor compaction of the tablet (see description of minor compactions, above).

Each update record subset (excluding any update records whose log position is earlier than the identified oldest needed log record) is applied to a corresponding data set, producing reconstructed data sets (508). More particularly, after the reorganization, the second servers apply the update record subsets to the memory state array 290 (FIG. 2C) of the corresponding data sets. As a result, the state of each data set, which includes both the redundant copies of the data set's files 280, 282 and the data set's memory state array 290, is brought up to its state immediately prior to the failure of the server that previously hosted the data set. At a later time, for instance during a compaction event, the data set updates stored in the memory state array 290 are recorded in durably stored files 282 (FIG. 2C). The second servers access the update record subsets corresponding to the data sets to which they are assigned and apply them to redundant copies of the corresponding base and supplemental sets of data to reconstruct the data set at the first server.

Figure 6:
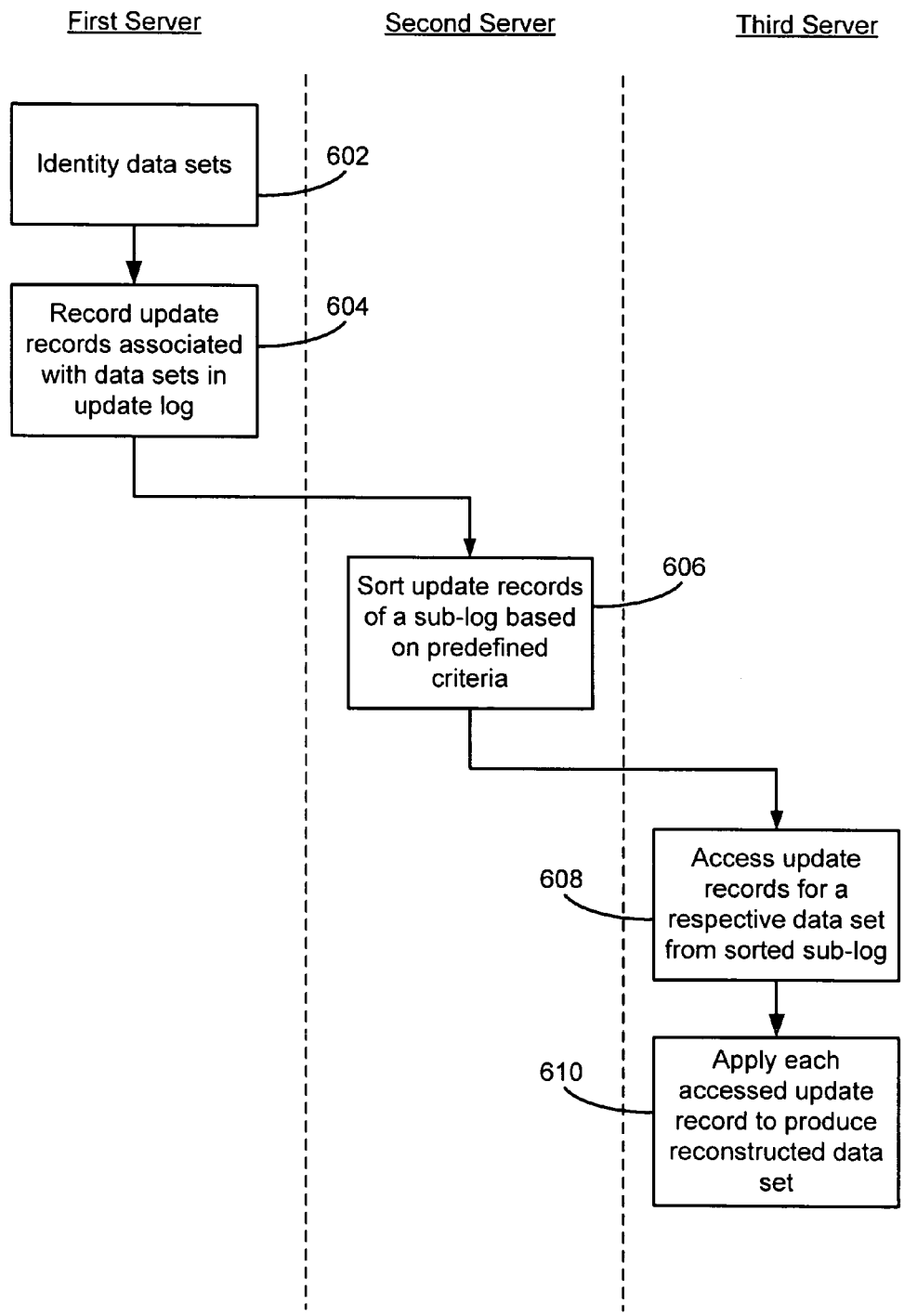
FIG. 6 is a flow diagram illustrating another process for reconstructing a data set, according to some embodiments of the invention.

FIG. 6 is a flow diagram illustrating another process for reconstructing a data set, according to some embodiments of the invention. At a first server, a plurality of data sets are identified (602). Update records associated with the identified data sets are recorded in the update log (604). These two operations are the same as operations 502 and 504 of FIG. 5.

A second server sorts a sub-log of the update log based on predefined criteria (606). When the first server fails, a plurality of other servers are assigned responsibility for the identified data sets. The second server, which may be one of these servers, sorts the update records within a sub-log based on predefined criteria. In some embodiments, the predefined criteria are the corresponding data set identifier and then the original relative order of the update records in the sub-log, such that the update records are grouped based on the corresponding data set while maintaining the relative order in which the updates are applied.

A third server, which is another server that is assigned at least one of the identified data sets, accesses update records corresponding to one of the data sets assigned to it, from the sorted sub-log (608). The accessed update records are applied to the data set, producing a reconstructed data set.

Figure 7:
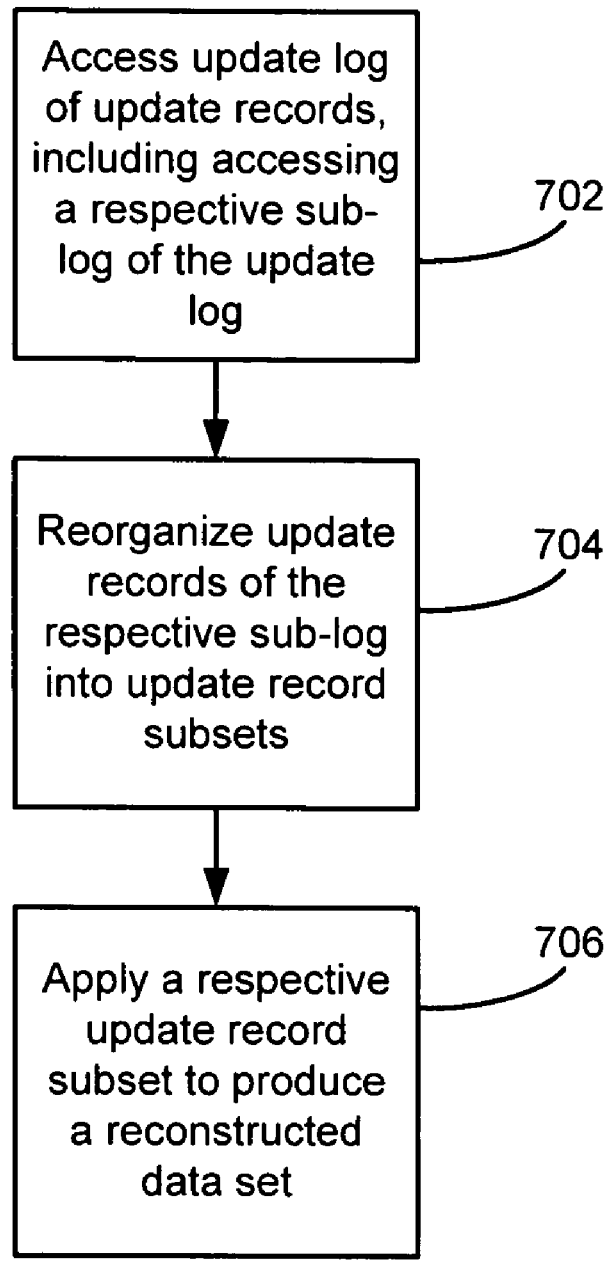
FIG. 7 is a flow diagram illustrating a process for reconstructing a data set at a data server, according to some embodiments of the invention.

FIG. 7 is a flow diagram illustrating a process for reconstructing a data set at a data server, according to some embodiments of the invention. When a first data server fails, a update log of update records (in some embodiments, a redundant copy of the update log) associated with the data sets assigned to the first data server is accessed (702). The accessing of the update log includes accessing one or more of the sub-logs in the update log. The update records of the accessed sub-log are reorganized into update record subsets (704). An update record subset is applied to a corresponding subset to produce a reconstructed data set (706).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of reconstructing a data set, comprising:
at a server system having one or more servers and memory storing programs executed by the one or more servers:
accessing an update log comprising update records associated with a plurality of data sets, each update record reflecting a change made to a respective one of the data sets, the update log including a plurality of non-overlapping sub-logs, each sub-log comprising a subset of the update records in the update log;
the accessing including accessing a respective sub-log of the plurality of non-overlapping sub-logs;
reorganizing the update records of the respective sub-log into update record subsets, each update record subset comprising the update records for a corresponding data set; and
applying a respective update record subset to the corresponding data set to produce a reconstructed data set.

2. The method of claim 1, wherein the accessing further includes:
identifying a subset of the plurality of non-overlapping sub-logs that is to be reorganized using metadata associated with the non-overlapping sub-logs; and
accessing the identified non-overlapping sub-logs to perform the reorganization.

3. The method of claim 1, wherein the reorganizing further includes:
sorting the update record subsets by their corresponding data sets' identifiers; and
sorting the update records within a respective update record subset by an order in which the update records are to be applied to a corresponding data set.

4. The method of claim 1, wherein the reorganizing further includes:
generating offset information pair for a respective update record subset in the reorganized sub-log, wherein the offset information specifies the starting location of the update record subset in the reorganized sub-log.

5. The method of claim 4, wherein the offset information includes a (dataset_identifier, offset_value) pair for the update record subset.

6. A computer system for processing data, comprising:
one or more processors;
memory storing executable instructions to be executed by the one or more processors:
to access an update log comprising update records associated with a plurality of data sets, each update record reflecting a change made to a respective one of the data sets, the update log including a plurality of non-overlapping sub-logs, each sub-log comprising a subset of the update records in the update log;
the instructions to access the update log including instructions to access a respective sub-log of the plurality of non-overlapping sub-logs;
to reorganize the update records of the respective sub-log into update record subsets, each update record subset comprising the update records for a corresponding data set; and
to apply a respective update record subset to a corresponding data set to produce a reconstructed data set; and
storage for storing the reconstructed data set.

7. The system of claim 6, wherein the instructions to access the respective sub-log includes instructions to access the respective sub-log in the storage of another computer system.

8. The system of claim 6, wherein the instructions for accessing the respective sub-log further include instructions for:
identifying a subset of the plurality of non-overlapping sub-logs that is to be reorganized using metadata associated with the non-overlapping sub-logs; and
accessing the identified non-overlapping sub-logs to perform the reorganization.

9. The system of claim 6, wherein the instructions for reorganizing the update records further include instructions for:
sorting the update record subsets by their corresponding data sets' identifiers; and
sorting the update records within a respective update record subset by an order in which the update records are to be applied to a corresponding data set.

10. The system of claim 6, wherein the instructions for reorganizing the update records further include instructions for:
generating offset information pair for a respective update record subset in the reorganized sub-log, wherein the offset information specifies the starting location of the update record subset in the reorganized sub-log.

11. The system of claim 10, wherein the offset information includes a (dataset_identifier, offset_value) pair for the update record subset.

12. A computer readable storage medium storing one or more programs to be executed by one or more computer systems, the one or more programs including instructions for:
accessing an update log comprising update records associated with a plurality of data sets, each update record reflecting a change made to a respective one of the data sets, the update log including a plurality of non-overlapping sub-logs, each sub-log comprising a subset of the update records in the update log;
the accessing including accessing a respective sub-log of the plurality of non-overlapping sub-logs;
reorganizing the update records of the respective sub-log into update record subsets, each update record subset comprising the update records for a corresponding data set; and
applying a respective update record subset to the corresponding data set to produce a reconstructed data set.

13. The computer readable storage medium of claim 12, wherein the instructions for accessing the respective sub-log further include instructions for:
identifying a subset of the plurality of non-overlapping sub-logs that is to be reorganized using metadata associated with the non-overlapping sub-logs; and
accessing the identified non-overlapping sub-logs to perform the reorganization.

14. The computer readable storage medium of claim 12, wherein the instructions for reorganizing the update records further include instructions for:
sorting the update record subsets by their corresponding data sets' identifiers; and
sorting the update records within a respective update record subset by an order in which the update records are to be applied to a corresponding data set.

15. The computer readable storage medium of claim 12, wherein the instructions for reorganizing the update records further include instructions for:
generating offset information pair for a respective update record subset in the reorganized sub-log, wherein the offset information specifies the starting location of the update record subset in the reorganized sub-log.

16. The computer readable storage medium of claim 15, wherein the offset information includes a (dataset_identifier, offset_value) pair for the update record subset.

* * * * *

UNITED STATES PATENT AND TRADEMARK OFFICE
CERTIFICATE OF CORRECTION

PATENT NO. : 7,668,846 B1  Page 1 of 1
APPLICATION NO. : 11/197923
DATED : February 23, 2010
INVENTOR(S) : Ghemawat et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Seventh Day of December, 2010

David J. Kappos
*Director of the United States Patent and Trademark Office*